(12) United States Patent
Code

(10) Patent No.: US 8,226,964 B2
(45) Date of Patent: Jul. 24, 2012

(54) SYSTEMS AND METHODS FOR CLEANING LIQUID CARRIERS RELATED APPLICATIONS DATA

(75) Inventor: Kenneth R. Code, Edmonton (CA)

(73) Assignee: Biolargo Life Technologies, Inc., Irvine, CA (US)

( * ) Notice: Subject to any disclaimer, the term of this patent is extended or adjusted under 35 U.S.C. 154(b) by 1056 days.

(21) Appl. No.: 12/009,586

(22) Filed: Jan. 18, 2008

(65) Prior Publication Data

US 2008/0121592 A1    May 29, 2008

Related U.S. Application Data

(63) Continuation-in-part of application No. 11/516,960, filed on Sep. 7, 2006, and a continuation-in-part of application No. 11/516,958, filed on Sep. 7, 2006.

(60) Provisional application No. 60/881,061, filed on Oct. 11, 2006.

(51) Int. Cl.
    *A01N 25/10*    (2006.01)

(52) U.S. Cl. ............... 424/405; 422/6; 422/28; 422/37; 424/667; 510/191; 510/195; 510/199

(58) Field of Classification Search .................. None
    See application file for complete search history.

(56) References Cited

U.S. PATENT DOCUMENTS

| | | | |
|---|---|---|---|
| 206,024 A | 7/1878 | Kendall | 222/432 |
| 2,134,791 A | 11/1938 | Loweke | 188/79.53 |
| 3,464,413 A | 9/1969 | Goldfarb et al. | 604/306 |
| 3,489,148 A | 1/1970 | Duncan et al. | 604/382 |
| 3,585,998 A | 6/1971 | Hayford et al. | 165/8 |
| 3,800,792 A | 4/1974 | McKnight et al. | 602/50 |
| 3,896,807 A | 7/1975 | Buchalter | 604/289 |
| 4,131,645 A | 12/1978 | Keblys et al. | 423/501 |
| 4,328,638 A | 5/1982 | Smithson | 43/124 |
| 4,375,535 A | 3/1983 | Kightlinger et al. | 527/313 |
| 4,381,784 A | 5/1983 | Aberson et al. | 604/368 |
| 4,405,323 A | 9/1983 | Auerbach | 604/285 |
| 4,416,703 A | 11/1983 | Scott | 134/8 |
| 4,418,686 A | 12/1983 | Child | 604/285 |
| 4,462,914 A | 7/1984 | Smith | 210/755 |
| 4,497,930 A | 2/1985 | Yamasaki et al. | 524/556 |
| 4,561,981 A | 12/1985 | Characklis | 210/696 |
| 4,561,983 A | 12/1985 | Davis et al. | 210/755 |
| 4,579,665 A | 4/1986 | Davis et al. | 210/755 |
| 4,675,014 A | 6/1987 | Sustmann et al. | 604/375 |
| 4,715,965 A | 12/1987 | Sigerson et al. | 210/511 |
| 4,722,937 A | 2/1988 | Jacob et al. | 514/474 |
| 4,731,391 A | 3/1988 | Garvey | 521/137 |
| 4,816,163 A | 3/1989 | Lyons et al. | 210/698 |
| 4,857,209 A | 8/1989 | Lyons et al. | 210/755 |
| 4,869,016 A | 9/1989 | Williams et al. | 43/124 |
| 4,888,118 A | 12/1989 | Barnes et al. | 210/668 |
| 5,019,495 A | 5/1991 | Shanbrom | 435/1.1 |
| 5,128,149 A | 7/1992 | Shanbrom | 424/529 |
| 5,128,150 A | 7/1992 | Shanbrom | 424/533 |
| 5,176,836 A | 1/1993 | Sauer et al. | 210/670 |
| 5,186,945 A | 2/1993 | Shanbrom | 424/529 |
| 5,192,451 A | 3/1993 | Gill | 210/755 |
| 5,201,326 A | 4/1993 | Kubicki et al. | 128/832 |
| 5,227,161 A | 7/1993 | Kessler | 424/94.4 |
| 5,265,302 A | 11/1993 | Sivacoe | 15/104.061 |
| 5,324,438 A | 6/1994 | McPhee et al. | 210/748 |
| 5,356,611 A | 10/1994 | Herkelmann et al. | 423/501 |
| 5,360,488 A | 11/1994 | Hieatt et al. | 134/22.11 |
| 5,360,605 A | 11/1994 | Shanbrom | 424/78.08 |
| 5,370,869 A | 12/1994 | Shanbrom | 424/78.22 |
| 5,384,929 A | 1/1995 | Smith | 15/104.061 |
| 5,419,902 A | 5/1995 | Kessler | 424/94.4 |
| 5,464,603 A | 11/1995 | Marchin et al. | 423/501 |
| 5,527,395 A | 6/1996 | Ludwig et al. | 134/3 |
| 5,552,051 A | 9/1996 | Wang et al. | 210/604 |
| 5,589,072 A | 12/1996 | Shanbrom | 210/638 |
| 5,609,864 A | 3/1997 | Shanbrom | 424/78.08 |
| 5,612,045 A | 3/1997 | Syverson | 424/402 |
| 5,629,024 A | 5/1997 | Kessler et al. | 424/667 |
| 5,635,063 A | 6/1997 | Rajan et al. | 210/266 |
| 5,639,452 A | 6/1997 | Messier | 424/78.1 |
| 5,639,481 A | 6/1997 | Kessler et al. | 424/667 |
| 5,643,588 A | 7/1997 | Roe et al. | 424/402 |
| 5,648,075 A | 7/1997 | Kessler et al. | 424/94.4 |
| 5,670,055 A * | 9/1997 | Yu et al. | 210/698 |
| 5,680,877 A | 10/1997 | Edstrand et al. | 134/103.1 |
| 5,753,180 A | 5/1998 | Burger | 422/7 |
| 5,772,971 A | 6/1998 | Murphy et al. | 422/292 |
| 5,800,629 A | 9/1998 | Fyfe et al. | 134/22.11 |
| 5,849,291 A | 12/1998 | Kessler | 424/94.4 |
| 5,873,944 A | 2/1999 | Lien et al. | 134/10 |
| 5,885,364 A | 3/1999 | Hieatt et al. | 134/22.11 |
| 5,885,592 A | 3/1999 | Duan et al. | 424/400 |
| 5,895,763 A | 4/1999 | Temple et al. | 436/55 |
| 5,900,157 A | 5/1999 | Petrille et al. | 210/755 |
| 5,903,946 A | 5/1999 | Collins et al. | 15/104.061 |

(Continued)

FOREIGN PATENT DOCUMENTS

| | | |
|---|---|---|
| EP | 439 878 | 8/1991 |
| EP | 0 446 761 | 9/1991 |
| EP | 611 206 | 8/1994 |
| WO | WO92/09289 | 11/1992 |
| WO | WO93/21299 | 10/1993 |

OTHER PUBLICATIONS

P. Kapur and M. Velma, "Determination of Iodate Ion in Presence of Cupric Ion", Industrial and Engineering Chemistry Analytical Ed.; vol. 13, No. 5 (May 1941). p. 338.

*Primary Examiner* — Neil Levy

(74) *Attorney, Agent, or Firm* — Mark A. Litman and Associates, P.A.

(57) ABSTRACT

A process for improving a liquid carrying system comprising physically disrupting a biofilm on interior surfaces of the liquid carrying system and then providing molecular iodine onto the disrupted biofilm in a concentration in aqueous material onto the biofilm of at least 10 parts per million. The reactants may be provided before physical disruption also. The molecular iodine may be added in gaseous or liquid or solid state, and may be formed in situ in the interior of the liquid carrier system using available or added water in the reaction.

17 Claims, No Drawings

U.S. PATENT DOCUMENTS

| | | |
|---|---|---|
| 5,919,374 A | 7/1999 | Harvey et al. ............... 210/753 |
| 5,924,158 A | 7/1999 | Watts ......................... 15/104.061 |
| 5,962,029 A | 10/1999 | Duan et al. ................... 424/613 |
| 6,004,465 A | 12/1999 | Uhr et al. ..................... 210/651 |
| 6,037,019 A | 3/2000 | Kooyer et al. ................ 427/598 |
| 6,067,682 A | 5/2000 | Rankin ....................... 15/104.061 |
| 6,071,415 A | 6/2000 | Frommer et al. ............ 210/669 |
| 6,076,536 A | 6/2000 | Ludwig et al. .............. 134/22.11 |
| 6,139,731 A | 10/2000 | Harvey et al. ............... 210/175 |
| 6,146,725 A | 11/2000 | Code ............................. 428/35.2 |
| 6,183,646 B1 | 2/2001 | Williams et al. ............. 210/636 |
| 6,248,335 B1 | 6/2001 | Duan et al. ................... 424/400 |
| 6,261,577 B1 | 7/2001 | Kessler ......................... 424/401 |
| 6,328,929 B1 | 12/2001 | Code ............................. 422/29 |
| 6,345,632 B1 | 2/2002 | Ludwig et al. .............. 134/22.11 |
| 6,365,220 B1 | 4/2002 | Burrell et al. ................. 427/2.1 |
| 6,403,113 B1 | 6/2002 | Corzani ........................ 424/404 |
| 6,403,674 B1 | 6/2002 | Schubert ...................... 522/167 |
| 6,432,426 B2 | 8/2002 | Kessler ......................... 424/401 |
| 6,599,432 B2 | 7/2003 | Kross et al. ................... 210/754 |
| 6,703,536 B2 | 3/2004 | Roe et al. ..................... 604/360 |
| 6,863,905 B1 | 3/2005 | Shanbrom ..................... 424/667 |
| 6,951,610 B2 | 10/2005 | Leonard et al. ............... 210/206 |
| 6,964,275 B2 | 11/2005 | Carl et al. .................... 134/22.11 |
| 7,000,280 B1 | 2/2006 | Knapp ....................... 15/104.061 |
| 7,033,509 B2 | 4/2006 | Klein et al. ................... 210/753 |
| 7,094,394 B2 | 8/2006 | Davies et al. ................. 424/54 |
| 7,192,911 B2 | 3/2007 | Sunder et al. ................ 510/223 |
| 7,584,519 B2 * | 9/2009 | Ouellette et al. ............. 15/227 |
| 2004/0167048 A1 | 8/2004 | Sunder et al. ................ 510/220 |

* cited by examiner

SYSTEMS AND METHODS FOR CLEANING LIQUID CARRIERS RELATED APPLICATIONS DATA

RELATED APPLICATIONS DATA

This application claims priority from Provisional Application No. 60/881,061, filed Jan. 18, 2007, which is a Continuation-in-Part application of U.S. Provisional Patent Application Ser. No. 60/850,976, filed Oct. 11, 2006 which is in turn a continuation-in-part of both of U.S. patent application Ser. No. 11/516,960, filed Sep. 7, 2006 and U.S. patent application Ser. No. 11/516,958, filed Sep. 7, 2006.

BACKGROUND OF THE INVENTION

1. Field of the Invention

The present technology relates to the field of liquid carrying systems and the cleaning of the carrying systems, particularly commercial or residential drain, run-off systems or rain systems and pipes. These treatments include physical treatment of spurious coatings within the carriers and delivery of active ingredients and/or delayed activity ingredients.

2. Background of the Art

Biofilms are biological films that develop and persist at interfaces in aqueous environments, especially along the inner walls of conduit material in industrial facilities, in household plumbing systems, on medical implants, or as foci of chronic infections. These biological films are composed of microorganisms embedded in an organic gelatinous structure composed of one or more matrix polymers which are secreted by the resident microorganisms. Biofilms can develop into macroscopic structures several millimeters or centimeters in thickness and can cover large surface areas. These biological formations can play a role in restricting or entirely blocking flow in plumbing systems and often decrease the life of materials through corrosive action mediated by the embedded bacteria. Biofilms are also capable of trapping nutrients and particulates that can contribute to their enhanced development and stability.

The involvement of extracellular polymers in bacterial biofilms has been documented for both aquatic; and marine bacteria, and the association of exopolysaccharides with attached bacteria has been demonstrated using electron microscopy and light microscopy. The presence of such exopolysaccharides is believed to be involved in the development of the microbial biofilm. Analysis of biofilm bacteria isolated from freshwater and marine environments has shown that the polymers they produce are composed largely of acidic polysaccharides. The control and removal of biofilm material from pipe and conduit surfaces has historically been carried out by the addition of corrosive chemicals such as chlorine or strong alkali solutions or through mechanical means. Such treatments are generally harsh to both the plumbing systems and the environment, and have been necessary due to the recalcitrant nature of biofilms within those systems. The resistance to treatment by biocides has been due in large measure to the protective character of intact biofilm matrix polymers. Improperly or incompletely maintained water distribution systems containing metal, plastic, concrete or concrete/asbestos pipe may show scale formation, sedimentation and microbiological tubercular growth by iron, manganese, sulfate-reducing, organic acid-producing, aerobic and other bacteria. This scale, sedimentation and growth may result in restricted water flow, higher pumping costs, customer complaints of the water's appearance, odor or taste, low chlorine residues, health hazards, system leakage and poor performance of the distribution systems.

Mechanical cleaning methods such as pigging, scraping, reaming and honing have been used to remove blockages from water distribution systems. These methods, however, require extensive excavation and opening of the distribution system for insertion of the appropriate tools. Valves must usually be removed and replaced along with hydrants, while elbows and hydrant connects are not usually cleaned mechanically and thus remain uncleaned. Fire protection systems such as fire sprinkler systems are impossible to clean mechanically.

Underscale corrosion causes small pits in the walls of systems which cannot be completely cleaned by mechanical methods. The residues cause immediate "red water" problems when the system is put back into service due to rust. In addition, residual bacterial growth results in new tuberculation with resulting reduced flow. Because of these residues, mechanical cleaning is normally followed by cement lining, epoxy lining, or other insertion/lining process. However, lining only covers up these residues. In addition, it decreases the diameter of the pipe and adds substantially to the rehabilitation cost.

Many of these blocked distribution systems can be cleaned by a low cost process using chemical cleaning solutions that are circulated in isolated sections of the system. One such method is disclosed in U.S. Pat. No. 5,360,488 which is assigned to the assignee of the present invention and is hereby incorporated by reference in its entirety, along with assignee's U.S. Pat. No. 5,527,395 covering a chemical cleaning process improvement, and U.S. Pat. No. 5,680,877.

U.S. Pat. No. 7,094,394 (Davies et al.) discloses a method of cleaning or protecting surfaces by treatment with compositions comprising N-(3-oxododecanoyl)-L-homoserine lactone (OdDHL) blocking compounds and/or N-butyryl-L-homoserine lactone (BHL) analogs, either in combination or separately.

U.S. Pat. No. 6,076,536 (Ludwig et al.) describes a method to chemically clean and immediately passivate a water distribution system to quickly form a passivation layer. The system may be a potable water system, a non-potable water system, a water well or a fire protection system such as a fire sprinkler system and may be treated with a biocide. A section of the system is isolated and chemically cleaned, then is immediately passivated using a high concentration of passivating agent. A passivating layer quickly forms, then the concentrated passivating agent is removed and a maintenance concentration of passivating agent is added. The cleaned and passivated section is restored to the system to provide improved water flow.

U.S. Pat. No. 6,964,275 (Carl) describes methods and compositions for cleaning and maintaining chemical, biological and radiological countermeasure washdown systems are disclosed. Systems are effectively cleaned by the removal of water scale, including deposits, sediment, microbiological scale, microinvertebrate fouling, and the like, from the inside surfaces of piping in the system. A section of the system is isolated for cleaning and an aqueous acidic cleaning solution is circulated through the fouled pipe section to be cleaned for a sufficient time and at a controlled pH to dissolve and loosen the scale. After cleaning all of the sections, the system is restored to operational readiness.

Mechanical cleaning with "snakes" or augers is also difficult and can only be used on straight runs of pipe for removing only the loose debris in the center of the pipe. High pressure air, water jet and mechanical cleaning require almost complete dismantling of the system to create access for cleaning.

Such dismantling requires extended periods of unacceptable downtime for the system and the ship.

Traditional means of chemical cleaning of scale from conventional (mostly iron) pipe systems by circulating acidic cleaning solutions through sections of the system to restore flow has been described in patents. U.S. Pat. Nos. 5,360,488 and 5,885,364 (Hieatt, et al.) describe a method for cleaning sections of potable water systems with acidic cleaning solutions. U.S. Pat. No. 5,527,395 (Ludwig, et al.) describes a chemical cleaning process improvement of U.S. Pat. No. 5,360,488. U.S. Pat. No. 5,680,877 (Edstrand, et. al) describes a system (equipment) for cleaning pipe sections of a water distribution network. U.S. Pat. No. 5,873,944 (Lien, et al.) describes a method of and a system for removing blockage from pipes in vacuum waste systems. U.S. Pat. No. 5,800,629 (Fyfe, et al.) describes a process for pipe system cleaning and in-line treatment of spent pipe system cleaning solution prior to disposal. U.S. Pat. No. 5,895,763 (Temple, et al.) describes a method for the controlled removal of carbonate scale from water conduit systems. U.S. Pat. No. 6,076,536 describes a method to chemically clean and immediately passivate a water distribution system. All of the above patents are assigned to the assignee of the present invention and are hereby incorporated by reference in their entirety. None of the above patents addresses the cleaning of countermeasure washdown systems, the scale associated with the countermeasure washdown systems or the cleaning of aluminum pipe associated with countermeasure washdown systems.

Additional patents describe physical/mechanical and chemical techniques to prevent the formation of various scales from forming in water pipe systems by treating the feed water. U.S. Pat. Nos. 4,328,638; 4,462,914; 4,561,983; 4,579,665; 4,816,163; 4,857,209; 5,192,451; 5,900,157 and 6,183,646 are examples. However, such physical/mechanical and chemical techniques are impractical for countermeasure washdown systems and none have been employed in combination with countermeasure washdown systems.

U.S. Pat. No. 6,183,646 (Williams) relates to the reduction and prevention of biofouling in facilities utilizing water, e.g. sea water, carrying biological organisms, without causing corrosion, chemical reaction or other detrimental action from the additive or environmental discharge problems. Such operations include, for example, desalination plants, power plants, oilfield water injection facilities and shipboard or ocean platform fire water systems. For example, in the desalination plant of FIG. 1, the biofouling reduction method and apparatus for this invention have a source of oxidizing agent such as chlorine ions or ozone, a source of copper ions and a dosing chamber for delivery of relatively low dosage levels of oxidizing agents and at appropriate times copper ions to form a treatment additive. Flow connectors connect the dosing chamber to various points along the piping in the desalination plant. A controller controls the operation of the dosing chamber and valves along the flow connectors to operate in a sequential target dosing mode to deliver treatment additive of predetermined composition to selected points along the piping at predetermined times and in predetermined concentrations.

U.S. Pat. No. 4,869,016 (Williams et al.) describes the synergistic effect of low dosage levels of chlorine ions used in conjunction with low dosage levels of copper ions to form a treatment additive sufficient to temporarily stress or disorient (but not "necessarily" kill) both macroorganisms and microorganisms so that they pass through the piping system of a facility without attaching themselves to the system. Being of low dosage, the chlorine and copper ions generated by this technique represent significantly less environmental concern than the previous techniques. As successful as this combined ion treatment approach may have been, it still suffered limitations as applied to large facilities. Combined ion treatment is effective for only a relatively short time duration (such as, for example, thirty (30) minutes). Thus, if combined ion treatment is used only at the water inlet to the piping system of a large facility, the treatment is effective for only part of the travel of the organisms through the piping system. Fouling can then occur in the downstream part of the piping system for which treatment effectiveness has been lost. Conversely, use of combined ion treatment at numerous points along the piping system requires a corresponding number of sources of ion generation, such as electrolytic cells for generating the treatment ions, with resultant increased capital costs and operating expenses, and can result in an environmentally unacceptable buildup of certain of the ions at discharge.

U.S. Pat. No. 6,599,432 (Kross) describes disinfecting compositions (such as chlorine dioxide) for dental unit water lines, particularly effective against microbial flora in biofilms which form on the luminal walls of the piping and reservoir components of dental equipment, as well as methods related to the use of such compositions to reduce microbial numbers in water-bearing dental and other equipment and maintain reduced levels on a continuous basis.

U.S. Pat. Nos. 7,000,280; 6,067,682; 5,924,158; 5,903,946; 5,384,929; 5,265,302; and the like describe pipeline pigs and pigging processes. All references cited in this text are incorporated herein by reference in their entirety.

SUMMARY OF THE INVENTION

Depositions within large liquid carrying media (such as pipes, drains, ducts, tunnels and the like) not only restrict flow efficiency but also become a repository or even growth medium for microbes such as bacteria. Treatment with antimicrobials alone has not been sufficient to reduce the danger of microbial buildup and the hazard of the carrying systems become hazardous themselves. This is especially true where large volumes of liquids are carried through the systems and deposited into large collection sites, reentered into potable sources (with cleaning and treatment), or directed towards the ocean or other large natural bodies of water. The carrying systems themselves thus become contaminating factors themselves for the environment. It is a practice within the scope of the disclosed technology to physically disrupt coatings within the interior of the carrying systems and then to generally expose the interior surface to an iodine ($I_2$) environment, as an aqueous concentrate and/or gaseous state. The iodine environment can be provided in numerous and varied tasks and services and even in combination with other additives such as film-breaking compositions such as acids (e.g., sulfamic acid, hydrochloric acid, sulfuric acid, enzymes, etc.).

Systems are used (such as pigging, scraping, tunneling, etching or grooving systems) that physically disrupt or break up the structural integrity of the deposits, so that either some or much of the material can be removed, but more importantly so that the generally penetration-resistant film surface is weakened so that further treatment, such as with antimicrobial materials, can reach the interior of the coating and reach even the structural surface of the interior of the carrier. The iodine treatments may be any delivery system that can deliver the iodine-rich environment as needed to an appropriate target. The delivery may be as a gas, liquid, films, powders, concentrates, liquids and the like that may be carried and contacted with as great a surface area as possible within the carrying system. The iodine may be provided as gas or reactants that form the iodine as a free-flowing, injectable, pourable, paintable, sprayable or otherwise deliverable forms. The materials may be provided, by way of non-limiting examples such as capsules, packets, powders, coated particles, concentrates or the like and may comprise a water absorbent or viscosity-enhancing material; and a composition that reacts with water to produce molecular iodine. The composition is delivered to provides a local concentration of at least 10 parts per million iodine in water carried by the material when the material has 5% by weight of water present in the water absorbent with respect to the total weight of the water absorbent material or concentrations that are sufficiently concentrated in air to address antimicrobial requirements or provide sufficient chemical activity to mediate the concentration of the targeted microbes in the environment of the carrying system.

DETAILED DESCRIPTION OF THE INVENTION

The potential for health and agricultural risks by the presence of pests in plants and soil has been repeatedly noted in the literature. It has also become apparent that pests become resistant to complex pesticides and that the volumes and costs of most manufactured pesticides has become prohibitive. The costs involved in making genetically modified crops reduces damage to crops, but may potentially enable the pests to persist more and become more dangerous to humans and livestock.

Additionally, it has become apparent that the overuse of chemicals in environments has accelerated the frequency of appearance and rate of appearance of antibiotic resistant pest strains in soils as well as contributing to contamination or other areas in water transmission connection to the carrier system. This and the physical stability of the coatings within the carrier system complicate the means of treating the systems and makes the total removal of contaminants from the carrier systems imperative so that the resistant strains do not move into the general liquid being carried to a more general environment and animal populations, including the human population. It is therefore an aspect of the present invention to provide systems and materials to liquid carrying environments, and especially water-carrying environments and systems to be treated which first disrupt deposited coatings in the liquid-carrying systems and then to generate an iodine gas-rich or iodine-dissolved-in-water rich environments that can provide anti-microbial activity that can penetrate the physically disrupted coating as gaseous iodine or gaseous iodine carried in a liquid such as water and thickened water in a controlled environment or location. The iodine environment can be provided in numerous and varied tasks and services and even in combination with other additives such as solvents or reactants for organic deposits that may constitute the film on the interior surface of the carrier.

One way of providing molecular iodine ($I_2$) on site is with an applicator. Transporting the applicator to a site to provide reactants that can readily produce molecular iodine on-site in a controllable reaction. One format of providing the molecular iodine would be through the oxidation-reduction reaction between two salts or compounds to produce the molecular iodine. It is a readily controlled environment where the reaction can be performed in an aqueous environment. One reaction that can effect this would be generically described as:

$$X^+Y^- + Z^+I^- \rightarrow X^+ + Z^+Y^- + I_2$$

In this reaction scheme, X is a metal (preferably a multivalent metal and more particularly a divalent metal), Y is an anion (preferably a multivalent anion and more preferably a divalent anion, and an anion having at least two oxygen atoms), Z is an alkali metal or alkaline cation. Examples of X are copper, iron, manganese, lead, nickel, tin, and the like, Y can be sulfate, sulfite, sulfonate, carbonate, phosphate, phosphate, nitrate, nitrie, borate, and the like, and Z can be sodium, lithium, potassium, ammonium, magnesium, aluminum, and the like. One preferred reaction would be:

$$Cu^{+2}SO_4^{-2} + K^+I^- \rightarrow Cu^{(+) \, or \, \circ} + K_2SO_4 + I_2$$

This reaction takes place readily in an aqueous environment and produces molecular iodine at a controlled rate. The reaction may be used by wetting, dispersing or dissolving the molecular iodide and allowing the iodine in the carrying material to be released and carried to the site (which may be the carrying material itself, such as the fabric, clay, fibers, film etc.) penetrate the area intended to be treated. The iodine may persist for sufficient time to treat the area, particularly within a wetted material on the surface of a particles or carrying medium. The reaction may also be used by dispersing or mixing the two ingredients into the carrying material (e.g., the fabric, fiber, film, sheet, etc.), either with additional water provided, with water of hydration on the first reactant (e.g., $X^+Y^-.nH_2O$, such as $CuSO_4.5H_2O$) or with ambient water in the carrying material. The two reactants may be physically separated from each other before being combined for application or reaction, as in separate capsules, viscous masses, gels, particle coated droplets, fibers, layers or the like. The two reactants may be provided as a solid carrier medium or separate particulate materials that separate the two reactants until they are in contact with water (as in a soluble carrier such as polyvinyl alcohol, gelatin, amylase, sugars and the like, in pellet, fiber, dust, particle or block form). At least one of the two reactants may be independently coated with a soluble/dispersible coating and the two ingredients kept in a single water-penetrable layer.

The technology described herein is performed by physically disrupting an interior coating on the interior surface of the carrying system (by physical means such as pigging, scraping, abrading, ablating, grooving, etching, and the like) and then applying the iodine antimicrobial system such as by applying a gas, liquid or solid or immediately provided carrier system to a location and either applying or awaiting the presence of sufficient water on or in the carrier system to activate the ingredients and cause the gaseous iodine to form in sufficient concentration in the solid carrier to attenuate, reduce or provide antimicrobial activity in the environment such as a pipe, tunnel, drain or the like.

A general outline of the various generic formats in which the application of materials may be performed according to the technology described herein includes at least the following and obvious variants from the following disclosure:

1. Application of Solid Separate Particulates

Each of the ingredients (e.g., most commonly provided as KI and $CuSO_4$) can be provided as separate uncoated particles. Each of the components, preferably in anhydrous or low-moisture containers would be provided to a site. The two solid particles would be injected into, sprayed onto, dusted onto, or otherwise applied onto, or otherwise deposited onto an interior surface within the carrier system. Water would either be simultaneously added, subsequently added, or even applied immediately before the application of particles, which would then react after activation (providing a reactive medium) by the water.

2. Application of Solid Coated Separate Particulates

The individual particles of each or at least one of the reagents would be coated with a material that is removed or penetrated by water, dissolving at least one component to bring the dissolved reagent into reactive contact with the other reagent. The purpose of the at least one coating is to prevent ambient moisture from causing the two reagents to react if they are stored in the same container. For example, if only the KI were coated, ambient (atmospheric) moisture would not be present in a container in sufficient amounts to dissolve KI and carry it through the coating to the other reagent. However, when both particles are deposited onto the surface of the carrying system, application of water by spraying, flow or precipitation would be sufficient to penetrate or remove the coating on the particles, dissolve the KI and/or the other reagent, and allow the ingredients to react. The coating on individual particles of the reagents does not need extreme strength or durability, but only needs sufficient stability to be retained on particle surfaces during transport. For this reason, even the application of silica particles, tacky solids (to adhere to the pipe or drain surfaces) that would form a somewhat porous coating on the reagents and be held to the surface by relatively weak forces (e.g., electrostatic forces, van der Waals forces, hydrogen bonding, surface tension, etc.) have been found to be sufficient. More typical porous or continuous coatings of water-soluble or water-dispersible materials, usually deposited out of non-aqueous solvents would also be desirable in the practice of this technology. Many biodegradable or even beneficial coating materials can be used for 'green' applications, such as amylase and amylopectin polymers, naturals gums and resins, low to moderate molecular weight waxes or lipids and the like.

3. Application of Active Aqueous Agent(s)

The reagents may be added to the soil in a relatively active state, with the reagents provided as solids in a liquid carrier, coated solids in a liquid carrier, or with at least one of the ingredients dissolved at the time of application. Such an active application must be done immediately after mixture of the reagents in an active medium, as the reaction is relatively fast. For example, if both materials are provided as solids, the two solids may be provided through a single chamber, dispersed into an aqueous medium, and immediately applied (e.g., sprayed, injected, plowed) into the soil so that the majority of the release of the iodine would be within the solid environment and would not be immediately released into the air.

In the applications described in the Related Applications Data section above, it is taught that that iodine gas is generated when metal salts (e.g., such as copper sulfate) and iodide salts (such as potassium iodide) are mixed in the presence of water and/or water gels from superabsorbing polymers (SAP), that this iodine is soluble in the water up to 337 ppm by setting up the chemical equilibria:

$$I_2+H_2O \leftrightarrow H_2OI^++I^- \text{ (hydrolytic ionization)} \quad 1)$$

$$H_2OI^+ \leftrightarrow HOI+H^+ \text{ (dissociation of } H_2OI^-\text{)} \quad 2)$$

$$HOI \leftrightarrow OI^-+H^+ \text{ (dissociation of HOI)} \quad 3)$$

$$3HOI \leftrightarrow IO_3^-+2I^-3H^+ \text{ (disproportionation of HOI)} \quad 4)$$

$$I_2+I^- \leftrightarrow I_3^- \text{ (formation of triiodide)} \quad 5)$$

$$I_2+H_2O \leftrightarrow HOI+I^- \text{ (iodine hydrolysis)} \quad 6)$$

$$3I_2+3H_2O \leftrightarrow IO_3^-+5I^-+6H^+ \text{ (iodate formation)} \quad 7)$$

$$>C{=}O+I_{2<<}>C{=}O_{\delta+} \ldots I-I_{\delta-} \quad 8)$$

$$R+I^- \leftrightarrow R.I^- \quad 9)$$

$$R+I_2 \leftrightarrow R.I_2 \quad 10)$$

$$R+I_{3-} \leftrightarrow R.I_3- \quad 11)$$

In these formulae, R is any organic moiety, wither aliphatic or aromatic or mixed aliphatic and aromatic. $R^+$ may be an acidic organic cation, preferably an organic acidic cation such as C6-C20 carboxylic acid backbones, sulfamyl, and the like.

The hydrolytic ionization that occurs during these equilibria leads to several acids which can be characterized as acidizing agents for descaling and cleaning of water and oil wells, sewer and stormwater runoff lines, and anywhere scale and biofilms are desired to be removed by solubilizing. The resulting acidified iodides are much more environmentally friendly for subsequent discharge owing to a well established iodine cycle known to exist between ocean waters and marine lands which receive oxidizing iodine from the ocean and which eventually returns to the ocean where it is restocked as iodate, following production of organic iodides in the watershed.

At present, the most widely known and accepted acidizing agents include HCl, sulfamic acid, lactic acid, citric acid, and acetic acid, all with varying degrees of reactivity for descaling. The effect of acidizing with iodine gas in solution, however, also attends with additive antimicrobial effects, and when the acidized iodine is combined with sulfamic acid, a powerful and effective method is provided for dissolving and remediating biofilms, and chelating heavy metals which may be solubilized by the process, or otherwise contained in water, especially after physical disruption as described herein.

Sulfamic acid is also a primitive surfactant, and when added to free iodine in water and stabilized by varying added compounds such as silicates (e.g., sodium metasilicate) and phosphates and sulfonates (e.g., sodium xylene sulfonate or phosphate), yields a disinfecting and biofilm removing detergent compound which is active within the technologies described herein for oilfield or watershed applications as a single formulary product.

General Applications for this Technology:

a) Oil, oil and water sludge, or water pipe descaling with remediation of bacteria, including oil-eating bacteria like pseudomonads among many others owing to the broad spectrum of effectiveness of iodine;
b) Spray descaling, or liquid bolus pipe treatment between scrapered pigs with or without gels formation with SAP's, and concomitant lubrication of pipe sidewalls of pipe up to 70 inches or more in diameter to allow pig movement; and
c) Bilge and equipment cleaning especially with excess xylene in the formula.

It would also be helpful in applying such reactive mixtures (solutions, dispersions, emulsions, suspensions, etc.) if the liquid mixture also contained a thickening agent or the like to provide reduced volatility to the water, make the solution of iodine gas adhere to the soil or plants better, and provide greater persistence to the applied liquid and the formed or carried iodine gas. Polymers, gums, resins, silica, and the like are typical thickening agents that might be used.

A simple format, in considering application to agricultural fields for treatment to prevent nematodes or other ground or water-dwelling pests or for any age or stage of pest animal, would include at least the following formats:

1) Separate particulate with separate reactants may be carried in the same container;
2) particulate and separate reactants may be carried in different containers for subsequent separate or joint application;
3) particulate reactants may be carried in the same pellets in an anhydrous condition;
4) the particulate reactants may be adhered to the same or separate carrier materials such as fertilizer pellets or seeds;

5) the reactants may be carried in carrier materials dispersed throughout or partially constituting a separate carrier material;
6) capsules or microcapsules of the reactants in water-soluble or water-dispersible shells may be dispersed over the ground; and
7) a film or films (water-soluble, water-dispersible or water-leachable) may carry one or more of the reactants, with the other reactant in a location that released or carried first reactant will be placed into contact with the second reactant in the presence of water.

Other formats and process may be used as long as the presence of water on the carrier system enables the generation of gaseous molecular iodine within the carrier in sufficient concentration to act as a pesticide.

The process may use the above reaction to form the molecular iodine represented by $$XY+ZI \rightarrow X^{o\ or\ +1}+ZY+I_2$$

wherein X is a metal, Y is an anion, Z is an alkali metal or alkaline cation, or where X is a multivalent metal, Y is a multivalent anion, and Z is an alkali metal or alkaline cation, and is preferably represented by $$Cu^{+2}SO_4^{-2}+K^+I^-Cu^{o\ or\ +1}+K_2SO_4+I_2.$$

The process also may be performed where the two reactants are carried in a superabsorbent polymer. The solids carriers for the two reactants may also include compositions of the present that comprise superabsorbent or non-superabsorbent polymers, natural products (e.g., papers, cellulosic solids, water-insoluble porous materials) which absorb or adsorb the film-forming material within the structure, water-soluble porous materials which absorb or adsorb the film-forming material within the structure, porous containers which merely slowly release a volume of the film-forming material, porous containers which both dissolve and physically release volumes of the film-forming composition through pores, and the like. In general, selection of an effective application rate can depend on habitat depth, surface debris, emergent and surface vegetation, organic matter, microbial and algal concentration, the specific target species, and the developmental stage of the target species. Superabsorbent polymers are described, by way of non-limiting examples in U.S. Pat. Nos. 6,403,674; 4,731,391.

Superabsorbent polymers, including starch graft co-polymers, are known in the art. See, for example, those described in U.S. Pat. Nos. 4,375,535 and 4,497,930 (incorporated herein by reference), which have disclosed uses as adhesives, flocculants, sizes, water-retaining materials for agriculture and water-absorbing materials for sanitary materials. However, the spectrum of advantages attendant the use of superabsorbent polymers in solid and flowable terrestrial insecticidal, pesticidal or insecticidal/pesticidal delivery compositions have gone unrecognized.

The superabsorbent polymers of the present invention are synthetic organic polymers which are solid and hydrophilic, absorbing over 100 times their weight in water. These superabsorbent polymers are typically in a powder, granule, extruded, or flake form, adapted to be blended and/or agglomerated into any shape or form.

The superabsorbent polymers may be, for example, acrylamide alkali metal acrylate co-polymers; propenenitrile homo-polymers, hydrolyzed, alkali metal salts; polymers of propenamide and propenoic acid, alkali metal salts; hydrolyzed acrylonitrile co-polymers, and starch graft co-polymers and ter-polymers thereof. All of these are designed to be hydrophilic, absorbing over 100 times their weight in water. The resulting hydrophilic polymers can absorb from over one hundred to greater than about 5000, more typically around 500 to about 1,000, times their own weight in water (measured using distilled water, pH 7.5, 25, 760 mm Hg. absorption within about 30 seconds). However, the absorption or swelling capacity and absorption or swelling time typically varies with each specific superabsorbent polymer.

One class of superabsorbent polymers include combinations of a starch and organic monomers, oligomers, polymers, co-polymers or ter-polymers. They may be manufactured in a variety of ways, for example, the methods described in U.S. Pat. Nos. 4,375,535 and 4,497,930, and can be, for example, the product of grafting corn starch (amylopectin) with acrylonitrile (an acrylic monomer or oligomer). A second class of superabsorbent polymers includes combinations of acrylamide and acrylate polymers, co-polymers and ter-polymers.

Other adjuvants may be added to influence the chemical activity of the Iodine technology, such as buffers, surfactants and other halogen generating materials such as iodates, chlorates, periodates, trihalides, halide complexes, halogen complexes, and the like.

The following examples are provided as prophetic descriptions of formats for delivery of technology according to the descriptions of the present invention.

Land mass, such as soil and sand, can be contaminated by pesticides in a number of manners. The most common manner of soil contamination is from improper handling or disposal of organic wastes and sewage and by animals carrying pests into the region. Excessive rainfall can also stress sewage systems, causing them to overflow and spill raw sewage carrying the pests over the land. Whatever the source of the pest contamination, the danger to vegetation and animal life can persist for extended periods of time and can severely affect both the medical and economic health of an area. It is therefore essential that methods and plans be developed that can treat a wide variety of pest contaminations, and do so in a rapid manner and at acceptable costs.

Land mass can not be moved about readily, and materials added to soil do not disperse as widely as materials added to aqueous systems. Materials added to soil for purposes of pest reduction or elimination must not persist beyond their useful life and must not contribute a contamination effect themselves.

Liquid carrier systems may become contaminated with any variety of microbes that may be harmful to vegetation or fauna that come into contact with the transmitted liquid. The water/liquid carrier system's internal coating is disrupted and is then treated with molecular iodine in vapor or dissolved liquid form to provide a concentration in water or aqueous mass of at least about 10 parts per million, preferably at least 30 parts per million per square meter of disrupted biofilm. The molecular iodine (as opposed to iodide anion) is provided as a) a gas, b) liquid or c) provided as two reactants that form molecular iodide (is a gas or into a liquid) in the water carrier system, either by using an aqueous carrier, water of hydration or ambient water. The source of molecular iodine may be topically applied, ploughed into the biofilm, injected into the disrupted biofilm as solids dispersed solids, liquids or gels, mixed into the disrupted biofilm, injected into the disrupted biofilm separately or contemporaneously with water-removable carrier layers, sprayed onto the disrupted biofilm, or otherwise applied where desired. Elemental iodine is a pesticidally active form of iodine that has been used as a water disinfectant for almost a century. It is also widely used as a sanitizing compound in the food processing industry.

Chlorine solution (especially hypochlorites) have been widely using by growers as a sanitizing wash for many fruits and vegetables. However, the strong oxidizing effect of chlorine in water with a moderate to high organic load results in a number of different complex compounds (trihalomethanes or THM) which can become a significant environmental hazard. There are strong reasons to minimize the excessive use of chlorine in the environment.

One way of providing molecular iodine ($I_2$) on site, rather than having to find a way of transporting it to a site) is to provide reactants that can readily produce molecular iodine on-site in a controllable reaction. One format of providing the molecular iodine would be through the oxidation-reduction reaction between two salts to produce the molecular iodine. It is a readily controlled environment where the reaction can be performed in an aqueous environment. One reaction that can effect this would be generically described as:

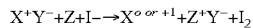
$$X^+Y^-+Z+I^-\rightarrow X^{o\ or\ +1}+Z^+Y^-+I_2$$

In this reaction scheme, X is a metal (preferably a multivalent metal and more particularly a divalent metal), Y is an anion (preferably a multivalent anion and more preferably a divalent anion, and an anion having at least two oxygen atoms), Z is an alkali metal or alkaline cation. Examples of X are copper, iron, manganese, lead, nickel, tin, and the like, Y can be sulfate, sulfite, sulfonate, carbonate, phosphate, phosphate, nitrate, nitrie, borate, and the like, and Z can be sodium, lithium, potassium, ammonium, magnesium, aluminum, and the like. One preferred reaction would be:

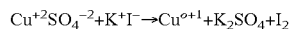
$$Cu^{+2}SO_4^{-2}+K^+I^-\rightarrow Cu^{o+1}+K_2SO_4+I_2$$

This reaction takes place readily in an aqueous environment and produces molecular iodine at a controlled rate. The reaction may be used, as intimated above, by either causing the reaction to occur in a container and directing the iodide into the disrupted film material within or onto the carrying system (as by gas injection or convection or other mass transfer) or by dissolving the molecular iodide and injecting or spraying the dissolved iodide into or onto the disrupted film. It is possible, where the spray of the iodine material is somewhat persistent (as when carried in a thickening agent or SAP, or if the reaction is delayed by withholding water) to apply the reactants or even an initiated reactive I2 forming composition onto the biofilm and then immediately disrupting the biofilm to distribute the iodine and/or iodine forming composition into the disrupted mass of the biofilm. The reaction may also be used by dispersing or mixing the two ingredients into the land mass, either with additional water provided, with water of hydration on the first reactant (e.g., $X^+Y^-.nH_20$, such as $CuSO_4.5H_20$) or with ambient water in the land mass. The two reactants may be physically separated from each other before being combined for application or reaction, as in separate pouches or containers. The two reactants may be provided in a solid carrier medium that separates the two reactants until they are in contact with water (as in a soluble carrier such as polyvinyl alcohol, gelatin, amylase, sugars and the like, in pellet or block form). The two reactants may be provided as liquids in separate containers to be mixed immediately before application. The two reactants may be independently coated with a soluble/dispersible coating and the two ingredients kept in a single water-tight container.

If provided in solid form (e.g., pellets, grains, tablets, powder, blocks, etc,), the solid is preferably mixed into the biomass of the disrupted biofilm rather than merely spread on top of the film. If the solids are sufficiently large (e.g., at least 1.0 mm, preferably at least 2.0 mm in diameter), they can be more safely sprinkled on the surface of the damp or pretreated surface of the film without as much concern of being unevenly distributed. The solids may be otherwise roughened into the disrupted film mass, raked into the mass, injected into the mass, mixed with solid disrupted mass or carrier material and deposited onto the disrupted mass or otherwise securely applied.

It will be apparent to one skilled in the art that there are various reactant chemicals that can be used. The reaction between anhydrous cupric sulfate and potassium iodine to produce iodine is one which is known in the art. Generally two parts (molecular stoichiometry) potassium iodine is required for every one part of anhydrous cupric sulfate to produce the desired reaction. In order to avoid problems in implementing the invention with the chemicals described above, the following matters should be noted. When using container or mixing prior to application, non-ferrous mixing containers and non-ferrous application instruments (or polymer coated ferrous material) should be used in order to avoid galvanic depositing of copper from solution. Application with absorbent and superabsorbent carriers (acrylic polymers, for example) has been found to require an additional amount of cupric sulfate over and above that used for the reaction. The reason for this is believed to be that the substrate has a tendency to sequester multivalent ions. With mixing in the vicinity fo workers, care should be taken to consult safety data sheets relating to iodine gas before experimentation of any magnitude is conducted.

Soil microorganisms tend to congregate at or underneath the biofilm surface in a shallow layer of approximately 0.5-10 centimeters in depth. This shallow layer is referenced as either the disruptable layer or the carrier layer. Microbial population size bears a direct relationship to the availability of food sources. A distribution of microorganisms may exist in the initial 0-75 centimeters of a biofilm profile (or even deeper) and may include aerobic bacteria, anaerobic bacteria, actinomycetes, fungi, viruses, and algae. The total aerobic and anaerobic bacteria in the upper 8 cm of film may be 77-80 percent of the total bacteria found in the 75 cm profile. 95 percent of all bacteria may be found in the upper 25 cm. of the film profile. Aerobic bacteria may average between 80-90 percent of the total bacteria for the film horizons investigated. Thus it is desirable that the gas or liquid containing the iodine be provided through the major portions of this depth, e.g., at least to 8-25 centimeters.

Iodine is the preferred sanitizing agent in the food industry as it is acknowledged as a more effective user friendly sanitizing agent than chlorine. In addition, depending upon the concentrations, it is safe, can be effectively used at reduced concentrations (up to ten times less) than chlorine yet with a higher microbial kill rate. Iodine (unlike chlorine) does not produce any harmful substances such as carcinogens, and if nearly all by-products are removed, can produce an environmentally safe waste water. Being a solid at room temperatures and supplied, immersed in water, the potentially harmful effects of exposure to a concentrated sanitizing agent such as chlorine are removed, significantly improving environmental work conditions. Furthermore, iodine is less corrosive than chlorine reducing corrosive effects from the use of a biocide.

A number of United States patents disclose the use of iodine in conjunction with processes for purification of water. For example, U.S. Pat. No. 4,888,118 discloses a water purification process in which the water is passed through a mass of nylon 4 complex with iodine. The treated water is subsequently passed through nylon 4 to remove iodine from the water.

One of the difficulties with the known systems is to maintain an optimum amount of active iodine delivered into the target water supply for the specified purpose. To date there has been no effective system which can effectively and economically guarantee the delivery of exactly the right amount of active iodine at higher levels into the water used to wash produce in the case where iodine is used for food sanitization or into water delivered through reticulation networks, not only to prevent waste of iodine and economic loss but also to ensure that there is an acceptable minimum of active iodine.

Iodine recovery processes are known whose objective is to recover iodine to compensate for gradual reduction of $I_2$ in the flowing water and to provide a desired iodine residual. The process described in U.S. Pat. No. 5,176,836 is distinguished from previous systems by providing a continuous long term microbiological control process in a water supply particularly in space vehicle applications wherein $I.sub.2$ is released into the water stream flowing through a suitable anion exchange resin.

U.S. Pat. No. 5,919,374 discloses a method and apparatus for producing bacteria free iodine species containing drinking water for farm animals under continuous dynamic water flow to produce a saturated iodine species containing aqueous solution at a pre selected temperature and blending the saturated solution with a second water flow to produce a diluted iodine species bacterium free aqueous solution.

U.S. Pat. Nos. 4,131,645; 5,356,611; 5,464,603; 5,639,452; 6,139,731; and 6,004,465 disclose prior art processes in which iodine is employed, each of which is incorporated herein by reference. The processes described in those US patents do not teach the use of means to effectively and economically control delivery of iodine in a water stream, nor do they disclose collection and conversion of iodide to iodine species for re use in the process.

Iodinated resin beds are known as a means for recharging a water supply with a minimum amount of active iodine. The recharging is effected by treatment with an aqueous iodine solution produced by flowing water through a bed of iodine crystals. The iodine residual is monitored and the bed recharged where necessary by adjusting the flow rate of water through the bed of iodine crystals. This is an expensive method of monitoring the level of active iodine and the resin rich in bound iodine is very expensive. In addition, the capacity of the resin is limited and reloading techniques in the field would be difficult to maintain in high water flow conditions. Also, this process is best suited to low level (<4 ppm) delivery of active iodine usually in a clean filtered water environment. This is due to the slow dissolving rate of iodine from known iodine beds and the limitation of the release rate and saturation of the anion exchange resins.

An ideal level of active iodine to be maintained in the aqueous content in the soil or sand is in the range of at least or greater then 10 ppm to 25 ppm although some applications may require higher concentrations. When iodine is used in large spill sanitizing applications, it may react with organic matter in which case the active iodine can be reduced to the point where there is little left for microbiological control. If resins (e.g., superabsorbing polymers) are used to deliver active iodine, this could necessitate continual monitoring of iodine concentration. It is expensive to use resin in large areas of soil, so it is likely that this mode of delivery would be used in more localized areas. Saturation of resin with 46% weight Iodine will produce around 4 ppm active iodine release, which is insufficient alone, but with the reactive mixture, higher concentrations of molecular iodine can be provided. A controlled iodine delivery process would be one in which the level of iodine can be maintained at a predetermined optimum level and without constant manual intervention and monitoring.

The process technology of the present disclosure may be practiced in a number of formats, such as a process for reducing the pest content in biofilm mass by providing molecular iodine in the biofilm mass in a concentration in aqueous material in the biofilm mass of at least 10 parts per million. The aqueous material should have a concentration of at least 10 parts per million is applied to the biofilm mass. Specific formats include two reactants are added to the biofilm mass and the two reactants react in the presence of water to generate a concentration of at least 10 parts per million in the water of the molecular iodine, especially where the two reactants are a) mixed with the biofilm mass and at least some of the water present is ambient water; b) mixed with the biofilm mass and at least some of the water present is water of hydration of one of the two reactants; c) mixed with the biofilm mass and at least some of the water present is applied to the biofilm mass at about the same time as the application of the two reactants; d) mixed with the biofilm mass and at least one of the two reactants is coated to prevent premature reaction with water or another reactant.

Among the ways of applying the molecular iodine are at least where molecular iodine gas is injected into the biofilm mass; where the molecular iodine gas is generated in a closed container and injected into the land mass; where the biofilm mass is physically disturbed to assist mixing of molecular iodine into the biofilm mass; where physical disturbance comprises plowing of the land mass; and where solid reactant material to generate the molecular iodine is deposited in the land mass by the physical disturbance. The process may use the above reaction to form the molecular iodine represented by $$XY + ZI \rightarrow X^{o\ or\ +1} + ZY + I_2$$

wherein X is a metal, Y is an anion, Z is an alkali metal or alkaline cation, or where X is a multivalent metal, Y is a multivalent anion, and Z is an alkali metal or alkaline cation, and is preferably represented by $$Cu^{+2}SO_4^{-2} + K^+I^- \rightarrow Cu^{o\ or\ +1} + K_2SO_4 + I_2.$$

All references cited herein are incorporated by reference in their entirety.

The concentration of the iodine forming material may be selected in the article according the ultimate needs and designs of the manufacturer, and the level of anti-bacterial effect desired. The concentration of the iodine gas in the liquid in the absorbent material is one measure of the desired results, and a further measure of the desired results is referred to in the art as the kill percentage, a measure of the percent of a specific bacteria (e.g., E. coli) in a liquid sample that would be killed in 5 minutes by the level of active ingredient present. An example would be that the presence of about 8 parts per million of gaseous iodine dissolved in the aqueous material in the absorbent material would have a kill percentage over 50%. It would be desired, as noted above, to have higher concentrations of gaseous iodine in the liquid so that kill percentages are at least 60%, at least 70%, at least 80% and even at least higher than 90% for targeted bacteria and other microbes. Depending upon the specific bacteria or microbe selected for the measurement, the liquid may have to be provided with at least 10 parts per million (ppm), at least 15 ppm, at least 20 ppm, or at least 25 ppm by controlling the amount of reagents added, the rate of reaction of the reagents, and other controls aimed at keeping the iodine in solution in the liquid, such as providing thickening agents or other materials that would reduce the volatility of the iodine gas from the solution.

EXAMPLES

Example 1

In a first experiment showing the efficacy of the iodine treatment on bacteria in soil, a natural sample from Santa Monica beach was user. This soil sample was taken from an area close to a storm drain. Concentrations started at 1100 MPN enterococci per 100 gram sediment were used. Wash samples having a concentration of greater than 10 parts per million were used on the soil samples. Enterocci concentrations approached zero for all of five consecutive washes. A longer term experiment was then performed with sand dosed with a pure culture of enterococci, the >10 ppm iodine solution imbibed in the soil, and then autoclaving. The bacterial level started at 1050 MPN/100 g, and went to zero immediately upon treatment. This was clearly evidenced in five washes (all zero). Two samples were treated with >10 ppm iodine solutions and left to sit on the roof for several days. The bacterial levels were approximately zero at the end of the experiment. Samples that were imbibed with the >10 ppm solution and the sand raked, had bacterial levels that decreased in concentration during the days, and rebounded at night for two nights, and then ended up at zero, indicating effectiveness of the solution, and a benefit to combination of the solution with heat and/or light. The undisturbed controls in both dark and light ended up with countable bacteria at the end.

Example 2

In a prophetic example, particles of KI and particles of copper sulfate are separately coated in water-removable coating materials such as hydrophobic fumed silica (e.g., 0.1-0.5 microns), cellulose fibers, lipids, water-softenable waxes, sugars (applied with non-aqueous solvents to avoid dissolution of the iodide or sulfate) or the like. The separate coated particles are carried to an water drain site, the interior surface of the water drain (with biofilm deposits thereon) are pigged with a polyurethane pig under 1000 mm Hg pressure) so that the biofilm is partially disrupted and the particles contemporaneously or subsequently dusted onto the disrupted biofilm surface of the interior of the pipe (either immediately before, during or immediately after disruption). Iodine gas and/or iodine dissolved in water is generated at concentrations necessary for biocide applications upon the introduction of water (precipitation, direct addition, or from existing ambient moisture in the soil).

Example 3

In a prophetic example, particles of KI were blended with 5% by weight Cab-O-Sil™ TG 709F hydrophobic fumed silica and blended together for a minimum of 30 seconds. This causes a layer of hydrophobic silica stand off particles to form a discontinuous layer on the KI surface. Old Bridge Chemicals $CuSO_4$ pentahydrate powder is also used but not treated with silica. Raw materials are mixed in the following ratio of 14.3 wt % active $CuSO_4$ and 85.7 wt % active KI. Upon intimate mixing this mixture does not show any discoloration or indication of reaction (iodine release) upon storage in 100% RH environment despite the close proximity of the intimately blended chemical reagent particles. This mixture of reagents is carried to a water drainage system site, the biofilm coating on the interior surface of the water drainage system, rain runoff pipe disrupted and the particles contemporaneously sprayed onto the interior disrupted surface (either immediately before, during or immediately after scraping of the interior surface of the pipe along its length). Iodine gas and/or iodine dissolved in water is generated at concentrations necessary for biocide applications upon the introduction of water (precipitation, direct addition, or from existing ambient moisture in the system).

Example 4

A prophetic example with a rain drain system having a seventy-inch interior diameter was provided with a pigging system and pressurizing system such as those available according to the teachings of U.S. Pat. Nos. 7,000,280; 6,067,682; 5,924,158; 5,903,946; 5,384,929; and 5,265,302. The interior of the pipe surface, after being treated with such pigging systems, has at least some of the biofilm disrupted by the pigging and attendant scraping action of the pigs, so that the film is sufficiently disrupted as to readily enable penetration by liquids and gases.

Either attached to a rear end of a pig or in a trailing device (either pressure motivated or self powered (as with an electric motor robot) is a simple spraying system having a carried source of reactants and/or a feed system from an exterior source of reactants and water. For example, a single container of mixed coated particles of copper sulfate and potassium iodide can be carried in the robot and a hose providing water is connected to the robot to provide an exterior source of liquid. The solids can be fed into a mixing area and the water fed into that same mixing area, and the combination of solids (now having their coatings dissolved, which also tends to render them somewhat tacky, so as to facilitate adherence to the interior of the carrier surface) and water is sprayed onto the pipe or drain (water carrier) surface. This spraying may be done by conventional nozzles of sufficient size as to not get clogged by the carried solids and using the pressure from the water feed to spray the solution/dispersion/suspension of solids and water. It is preferred that a swiveling head be provided to assure coverage of the interior surface. It is to be noted that lower areas of the drain will be covered by runoff of liquid or the gases will disperse in the environment and contact all surfaces.

For shorter distances between the entry into the system and the points of film disruption and iodine application, it would be easy to mix materials outside of the system, transport them to the points of application, and then spray the mass with out y having to carry the iodine reactants themselves on the robot. By using a tackifying, slowly dissolving removable reactant coating on the particles, larger distances of application can be effected, as the reagents will adhere in the applied areas and the local presence of water will continue the iodine releasing action at the appropriate location.

Alternative disrupting means can be the hole/tunnel drilling systems with three overlapping rotating drill heads that revolve as well as rotate to provide a generally circular drilling format. The individual drill bits (e.g., the three symmetrical drill bits typically used) are also movable or adjustable radially to comport to the variations in the dimensions of the interior of the pipe and also any joints. By setting a maximum radial extension to a centimeter less than the actual minimum interior dimension of the pipe, thick biofilm can be assured of disruption without fear of causing significant damage to the pipe itself by the drill bit. Additionally, rather than the iron nitride or diamond drill bits used for tunneling, softer drill bits can be used that will abrade or disrupt the biofilm coating, but will not readily damage the pipe material.

A laser system (e.g., pulsed excimer laser may be used with the laser beam transmitted and the redirected in all directions within the interior of the drain) may also be used for physical disruption. Chemical means may be used to physically disrupt the biofilm, but reducing the chemical input into the drain is highly advantageous. Even within the present system the capture, filtering or other means of removing precipitated metals (e.g., the copper iodide) is desirable and may be required.

Additional variations may be added to the system such as the application of radiation (especially Ultraviolet radiation) in addition to the physical disruption and the iodine treatment.

All references cited herein are incorporated by reference in their entirety.

What is claimed:

1. A process for improving a liquid carrying system comprising physically disrupting a biofilm on interior surfaces of the liquid carrying system and then providing molecular iodine onto the disrupted biofilm in a concentration in the aqueous material applied to the biofilm of at least 5 parts per million.

2. The process of claim 1 wherein an aqueous material having a concentration of at least 10 parts per million is applied to the disrupted biofilm.

3. The process of claim 1 wherein two reactants are added to the disrupted biofilm and the two reactants react in the presence of water to generate a concentration of at least 10 parts per million in the water of the molecular iodine.

4. The process of claim 3 wherein the two reactants are mixed with the disrupted and at least some of the water present is ambient water.

5. The process of claim 3 wherein the two reactants are mixed with the disrupted biofilm and at least some of the water present is water of hydration of one of the two reactants.

6. The process of claim 3 wherein the two reactants are mixed with the disrupted biofilm and at least some of the water present is applied to the biofilm at about the same time as the application of the two reactants.

7. The process of claim 3 wherein the two reactants are mixed with the disrupted biofilm and at least one of the two reactants is coated to prevent premature reaction with water or another reactant.

8. The process of claim 1 wherein the biofilm is disrupted by pigging.

9. The process of claim 1 wherein molecular iodine gas is released within the liquid carrying system and the gaseous iodine migrates into the disrupted biofilm.

10. The process of claim 9 wherein the molecular iodine gas is generated in a closed container and injected into the disrupted biofilm.

11. The process of claim 1 wherein the biofilm is physically disturbed to assist mixing of molecular iodine into the disrupted biofilm.

12. The process of claim 11 wherein physical disturbance comprises scraping of the biofilm.

13. The process of claim 11 wherein solid reactant material to generate the molecular iodine is deposited into the biofilm by the physical disturbance.

14. The process of claim 3 wherein the reaction to form the molecular iodine is represented by $XY+ZI \rightarrow X^{o}$ or $^{+1}+ZY+I_2$ wherein X is a metal, Y is an anion, Z is an alkali metal or alkaline cation.

15. The process of claim 3 wherein the reaction to form the molecular iodine is represented by $XY+ZI \rightarrow X^{o}$ or $^{+1}+ZY+I_2$ wherein, X is a multivalent metal, Y is a multivalent anion, and Z is an alkali metal or alkaline cation.

16. The process of claim 3 wherein the reaction to form the molecular iodine is represented by $C^{+2}SO_4^{-2}+K^+I^{31} \rightarrow Cu^{o}$ or $^{+1}+K_2SO_4+I_2$.

17. The process of claim 3 wherein the two reactants are carried in a superabsorbent polymer.

* * * * *